United States Patent
Kitchener et al.

(10) Patent No.: US 9,755,944 B2
(45) Date of Patent: Sep. 5, 2017

(54) APPARATUS FOR TESTING DATA COMMUNICATIONS ON TWO WIRE COMBINED POWER AND DATA NETWORK SYSTEMS FOR AUTOMATION

(71) Applicant: Pepperl + Fuchs GmbH, Mannheim (DE)

(72) Inventors: Renato Kitchener, West Sussex (GB); Gunther Rogoll, Mannheim (DE)

(73) Assignee: Pepperl + Fuchs GmbH (DE)

( * ) Notice: Subject to any disclaimer, the term of this patent is extended or adjusted under 35 U.S.C. 154(b) by 218 days.

(21) Appl. No.: 14/399,384

(22) PCT Filed: May 8, 2013

(86) PCT No.: PCT/EP2013/059633
§ 371 (c)(1),
(2) Date: Nov. 6, 2014

(87) PCT Pub. No.: WO2013/167682
PCT Pub. Date: Nov. 14, 2013

(65) Prior Publication Data
US 2015/0163123 A1    Jun. 11, 2015

(30) Foreign Application Priority Data
May 8, 2012 (GB) .................................. 1208019.8

(51) Int. Cl.
H04L 12/26 (2006.01)
H04L 12/413 (2006.01)
H04L 1/24 (2006.01)

(52) U.S. Cl.
CPC .......... *H04L 43/50* (2013.01); *H04L 12/413* (2013.01); *H04L 1/24* (2013.01); *Y04S 40/168* (2013.01)

(58) Field of Classification Search
CPC ......... H04L 43/50; H04L 12/413; H04L 1/24; Y04S 40/168
See application file for complete search history.

(56) References Cited

U.S. PATENT DOCUMENTS

| 7,321,846 B1 * | 1/2008 | Huisenga | H04L 1/24 702/183 |
| 2009/0059492 A1 * | 3/2009 | Glover | H01H 13/86 361/679.09 |

(Continued)

FOREIGN PATENT DOCUMENTS

KR    20100070132 A  *  6/2010

OTHER PUBLICATIONS

Gunther Rogall et al., "Advanced Online Physical Layer Diagnostics", Technical White Paper Pepperl + Fuchs, xx., xx, Aug. 30, 2014, page complete, XP002434472.

(Continued)

*Primary Examiner* — Paul H Masur
(74) *Attorney, Agent, or Firm* — Lerner, David, Littenberg, Krumholz & Mentlik, LLP (57) ABSTRACT

Apparatus for testing data communications on two wire combined power and data network systems for automation, comprising a control means and connection means adapted to connect said apparatus to a subject network segment, in which said control means comprises data signal output means adapted to impart a test data signal to said subject segment via said connection means, and a data signal disruption means adapted to vary one or more physical layer attributes of said test data signal which affect its functional quality and/or to vary one or more physical layer attributes of said subject segment which are capable of affecting the functional quality of data signals carried thereon.

12 Claims, 4 Drawing Sheets

(56) References Cited

U.S. PATENT DOCUMENTS

2009/0222699 A1\* 9/2009 Abbott ..................... H04L 1/24
714/46
2012/0027062 A1 2/2012 Garcia

OTHER PUBLICATIONS

International Search Report and Written Opinion for Application No. PCT/EP2013/059633 dated Aug. 19, 2013.

\* cited by examiner

APPARATUS FOR TESTING DATA COMMUNICATIONS ON TWO WIRE COMBINED POWER AND DATA NETWORK SYSTEMS FOR AUTOMATION

CROSS-REFERENCE TO RELATED APPLICATIONS

The present application is a national phase entry under 35 U.S.C. §371 of International Application No. PCT/EP2013/059633 filed May 8, 2013, published as WO 2013/167682 A1, which claims priority from GB Application No. 1208019.8 filed May 8, 2012, the disclosures of which is hereby incorporated herein by reference.

The present invention relates to apparatus for testing data communications on two wire combined power and data network systems for automation, for use particularly, but not exclusively, to test data communications on network segments operating under the IEC61158-2 Fieldbus protocol, and under the protocols which will eventually replace this.

Fieldbus is the name of a family of industrial computer network protocols used for real-time distributed control, now standardized as IEC61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the Fieldbus, which links the PLCs to the components which actually do the work such as sensors, actuators, electric motors, console lights, switches, valves and contactors. The Fieldbus is usually a two wire combined power and data network, which provides both power and communications to the field components.

The various components of the system communicate with one another using the Fieldbus IEC61158-2 communications protocol, which is a Manchester encoding system. Data telegrams are transmitted either on dedicated communications circuits, or on the same electrical circuits as the power to drive the field instruments. The data telegrams serve to control and to monitor and diagnose the field instruments in use.

Fieldbus is often used in Intrinsically Safe environments, for example combustible atmospheres, and in particular gas group classification IIC, Hydrogen and Acetylene, and below, for example gas group IIB and IIA, for gas and/or dust. In a typical combined two wire Fieldbus electrical power and communications circuit there is a power supply, an Intrinsic Safety barrier of some kind, a trunk section leading out into the field, and a number of device couplers with spurs connected thereto, on which the field instruments are mounted. The trunk and the spurs together form a "segment". The Intrinsic Safety barrier divides the circuit into an Intrinsically Safe side and a non-Intrinsically Safe side. The power supply, the PLCs and other systems like physical layer diagnostic modules which measure physical layer attributes of the electrical circuit and the network hardware, and in part the physical software or protocol being used, are located in the non-Intrinsically Safe side of the circuit, usually in a control room. The trunk, the device couplers, the spurs and the field instruments are located in the Intrinsically Safe side, out in the field.

The IEC61158-2 Fieldbus communication protocol, along with other similar data systems such as DSL, Ethernet, HART and so on, and those which will eventually replace IEC61158-2 Fieldbus, comprise a set of discrete physical layer limits within which the communications signals, and the hardware which hosts them, must operate. These physical layer limits include aspects of the signalling, including the data shape and timing rules. These limits and tolerances are very conservative, so the resulting systems are highly robust and not prone to failure. In addition, this conservative approach means that when a system is physically installed it usually operates correctly first time without the need for adjustment, even though in practice a system can operate somewhat differently to how it was initially designed.

However, there are a number of inherent problems associated with the current approach. The first is that the set standards which define the protocol are considered discretely from one another. In practice a deviation in two or more physical layer attributes which separately would not breach the relevant standards, can combine to cause a failure in practice. For example, a field device can demonstrate data rejection when there is noise added to signal distortion. As such, failure can occur even when the discrete physical layer limits of IEC61158-2 are not breached.

In addition, the IEC61158-2 Fieldbus communications protocol is only concerned with physical layer attributes of the signals themselves. There are other physical layer attributes which are not included within the standards, the deviation of which could cause a failure in combination with a non-critical deviation in one or more of the physical layer attributes which are included in the standards. Physical layer attributes which are not accounted for in the IEC61158-2 protocol include current consumption, power supply capacity, device brown out tolerance and voltage limits, although there is an absolute minimum limit for some of these variables. Therefore, once again a failure can occur even when the discrete physical layer limits of IEC61158-2 are not breached.

Another issue with the existing standards is that they define theoretical thresholds for failure, whereas in practice a system may continue to function beyond the set limits. It has been found that the actual failure points can be far greater than the theoretical limits in some systems. For example, band noise limits are set at fifteen or sixteen milivolts, but it has been seen that some systems are actually capable of coping with ten times this amount. In addition, a net unbalance limit is set at approximately twenty four nanoFarads, but a short circuit of one pole to ground will effectively create an infinite capacitance far exceeding this limit, yet systems have been designed to work under these conditions because it is such a likely failure.

However, in order to accord with the IEC61158-2 Fieldbus protocol, and no doubt the protocols which will succeed it, communications circuits are connected to diagnostic systems configured to issue alarms, or to take other appropriate measures, when these theoretical failure thresholds are breached in use. In addition, it is also known to test Fieldbus segments prior to use, or during maintenance, using portable testing equipment which is configured to record a failure if a theoretical threshold is breached. This reliance on theoretical rather than actual limits creates two problems. The first is that in use alarms may be triggered, or other actions taken, when it is not actually necessary to ensure the continued operation of the system, and that likewise during testing a failure may be recorded when it would not occur in practice. The second problem is that reliance on theoretical thresholds, both during testing and use, prevents knowledge of where the actual points of failure lie.

Therefore, in no sense is the actual capability of any given Fieldbus segment known. Unanticipated failures can occur within the protocol thresholds on the one hand, and successful operation of the system beyond the theoretical limits can occur on the other. As such, the known diagnostic and testing systems are not effective, because they are not sensitive to some failures, and they are over-sensitive to others, leading to unnecessary proactive measures. This lack of a true appreciation of the performance of a Fieldbus segment has an impact during its design stage, because the design may not function in practice as anticipated, and because it may be designed more conservatively than necessary. This problem is exacerbated by the fact that once a Fieldbus segment has been physically implemented it can differ in its performance from the design, for example due to different cable lengths being used, or alternative components. As such, it may be even more prone to failure, or even more robust than thought, making it even more conservative than necessary.

Therefore, it will be appreciated that if the actual failure points were known, a more effective diagnostics and fault management arrangement could be achieved. In particular, breaches of the theoretical thresholds which do not actually lead to failure could be accepted for an extended time, and users could have the confidence to overrun until the next scheduled maintenance slot. In addition, failure points within the theoretical thresholds can be better anticipated.

In order to discern the actual failure points, it would be necessary to perform tests on the Fieldbus segment or network. Equipment which can configure and measure physical layer attributes of Fieldbus segments are known, however they are only capable of measuring these attributes. For example, they can monitor current, noise, signal distortion, voltage and unbalance. However, they are not capable of varying physical layer attributes on a Fieldbus segment in order to accurately determine the actual point of failure. For example, they cannot vary the amplitude of a signal to determine precisely when it can no longer be deciphered by a field instrument or host. In addition, they only measure one physical layer attribute at a time, and they cannot determine to what degree a variance in one physical layer attribute within the normal threshold might combine with a variance in another physical layer attribute also within the normal threshold, to cause an actual failure. All the known devices can do is discretely determine whether a signal satisfies or breaches a nominal threshold.

To measure impedance some existing testers use an injected high frequency wave or pulse, however this doesn't measure the impedance of the power supply alone, moreover, the reading taken is only an inference of the impedance of the system and does not serve as an indication of data signal quality. Measuring data quality directly cannot be used to asses the impedance, because the data quality itself is unknown.

The present invention is intended to overcome some of the above problems.

Therefore, according to the present invention apparatus for testing data communications on two wire combined power and data network systems for automation, comprises a control means and connection means adapted to connect said apparatus to a subject network segment, in which said control means comprises data signal output means adapted to impart a test data signal to said subject segment via said connection means, and a data signal disruption means adapted to vary one or more physical layer attributes of said test data signal which affect its functional quality and/or to vary one or more physical layer attributes of said subject segment which are capable of affecting the functional quality of data signals carried thereon.

Thus, the present invention provides apparatus which can vary the physical layer attributes of any two wire combined power and data network system for automation, such as an IEC61158-2 Fieldbus segment or what might be developed to replace it, so it can be determined at what point a data signalling failure actually occurs in practice due to the degradation of the functional quality thereof. As discussed above, this could be within the theoretical thresholds of the relevant protocol, such as IEC61158-2, or beyond them.

As explained above, the present invention can involve varying physical layer attributes of the test data signal, but also physical layer attributes of the subject segment. The distinction here is between distorting characteristics of the test data signal, and actually changing physical layer characteristics of the subject segment itself. On the one hand the adjustment assesses how a distorted signal performs on the subject segment, and on the other hand the adjustment assesses how disruption on the subject segment affects the performance of the test data signal, distorted or otherwise.

The data signal output means referred to above can either generate the test data signal entirely, as if it were an emulated host or a field device, or the apparatus can intercept and/or repeat an existing communications signal sent between an actual host and a field device, in which case the data signal output means serves to apply the distortion provided by the data signal disruption means to the existing signalling. In each case the data signal output means "imparts" a test data signal onto the subject segment because the output in either instance is effectively a new signal whose only purpose is to determine faults. When the data signal disruption means varies a physical layer attribute of the subject segment, once again there is an imparting of a test data signal, in the sense that a new signalling condition has been created. This effectively results in a test data signal, in the sense that the signal, either generated or existing, and either directly distorted or not, is affected by the change in its conditions.

There are two different ways a physical layer attribute of the test data signal or of the segment itself can be varied. In the first instance the attribute can be adjusted, and in the second something can be injected which has an effect on the attribute. For example, with regard to the signalling, the waveform of a data signal can be adjusted in amplitude, but the noise level on a segment can be varied by injecting noise onto the segment. With regard to the segment itself, the current can be adjusted, but a fault can be injected, such as inserting a capacitive unbalance on a given conductor to ground, or adding a variable or fixed quiescent current sink across given conductors. An adjustment and an injection can by applied simultaneously, as they may affect one another, and as such they could be considered as a single testing action. However for the ease of understanding the invention it is better to appreciate the distinction. It may also be preferred to practically separate such actions when the invention is put into practice, again to allow for a greater understanding of the operation of the apparatus by the user.

Following on from the above, in a preferred embodiment of the invention said data signal disruption means can be adapted to vary two or more of said physical layer attributes of said test data signal which affect its functional quality or said physical layer attributes of said subject segment which are capable of affecting the functional quality of data signals carried thereon.

With this arrangement the apparatus can determine to what degree a variance in one physical layer attribute within the normal threshold might combine with a variance in another physical layer attribute also within the normal threshold, to cause an actual failure.

The data signal disruption means can be adapted to vary one or more physical layer attributes of said test data signal which affect its functional quality and/or one or more physical layer attributes of said subject segment which are capable of affecting the functional quality of data signals carried thereon in a common mode manner and/or a differential mode manner. The difference between a common mode and a differential mode change will be apparent to the skilled person, and involves varying both communication lines of a two wire segment in the same way, or in different ways respectively.

It will be appreciated that there are many physical layer attributes of a test signal or a subject two wire segment which can be varied, in order to make all kinds of fault point determinations. However, a small number of key physical layer attributes are central to the correct functioning of Fieldbus communications signalling (and the like), and preferably said data signal disruption means can be adapted to adjust the amplitude of said test data signal and/or the zero crossing accuracy of said test data signal and/or to inject noise to said subject segment. Faults associated with variance in these physical layer attributes are the most common, and the ones of which it is most desired to determine the actual fault points. For example, it has been found that the zero crossing accuracy of a data signal can be worse than the prescribed limits of IEC61158-2 without causing device failure, but at the same time a fault can occur when the zero crossing accuracy of a data signal is within those limits, but there is too much noise on the segment.

It is not necessary for the apparatus of the invention to comprise means to determine if a fault has occurred, because in many cases other existing equipment either integral to the subject segment, or specifically connected to it for the purpose, could perform this function. However, in a preferred embodiment the apparatus of the invention can further comprise monitoring means adapted to detect faults on said subject segment caused by a failure of said test data signal. This way a singular solution which can vary physical layer attributes and then determine precisely when a fault has occurred as a result can be provided.

The invention can be integrated into a Fieldbus segment, or the like, but preferably the apparatus of the invention can comprise a portable device, and said connection means can comprise an analogue/digital output for imparting said test data signal to said subject segment, and a physical layer attribute modifier for varying one or more physical layer attributes of said subject segment. With this arrangement the apparatus of the invention can be applied to different installed segments as required, and can be used during installation thereof, or later for further testing.

In order to improve its functionality the portable device could be connectable to the control room systems, so its performance and readings can be monitored or controlled from there. Therefore, in a preferred embodiment the apparatus can further comprise a higher control means, a data storage means associated with said higher control means, and a wired or wireless link between said portable device and said higher control means. This way the test readings taken can be stored immediately for later use.

The portable device can be powered in any of the known ways, including by an internal battery, by an external power supply, or by the power supply of the subject segment itself. Preferably the portable device can be suitable for both indoor and out door use. Therefore, the apparatus can comprise environmental protection components which render the portable device resistant to the ingress of water.

It will be appreciated that to test a Fieldbus segment or the like in the manner envisaged it will be necessary to bring the portable device into a Intrinsically Safe area. As such, the apparatus can comprise Intrinsic Safety protection components which render the apparatus safe for use in Intrinsically Safe hazardous areas. This can be achieved in any of the known ways, for example with the inclusion of relevant protection components positioned at the relevant points, as outlined in the relevant standards. Other methods of Intrinsic Safety protection could also be adopted, for example active hazardous arc monitoring and detecting systems. The advantages and disadvantages of the different approaches will be appreciated by those skilled in the art.

As explained above, the present invention can be used with any kind of two wire combined power and data network system for automation operating in accordance with any of the known protocols, or those which will replace them. However, in one particular embodiment of the invention it is for testing data communications on IEC61158-2 Fieldbus segments. As such, the connection means can be adapted to connect said apparatus to a subject IEC61158-2 Fieldbus segment, and said data signal output means can be adapted to impart a test IEC61158-2 Fieldbus data signal to said subject segment via said connection means.

One embodiment of the present invention will now be described by way of example, and with reference to the accompanying drawings, in which.

Figure 1:
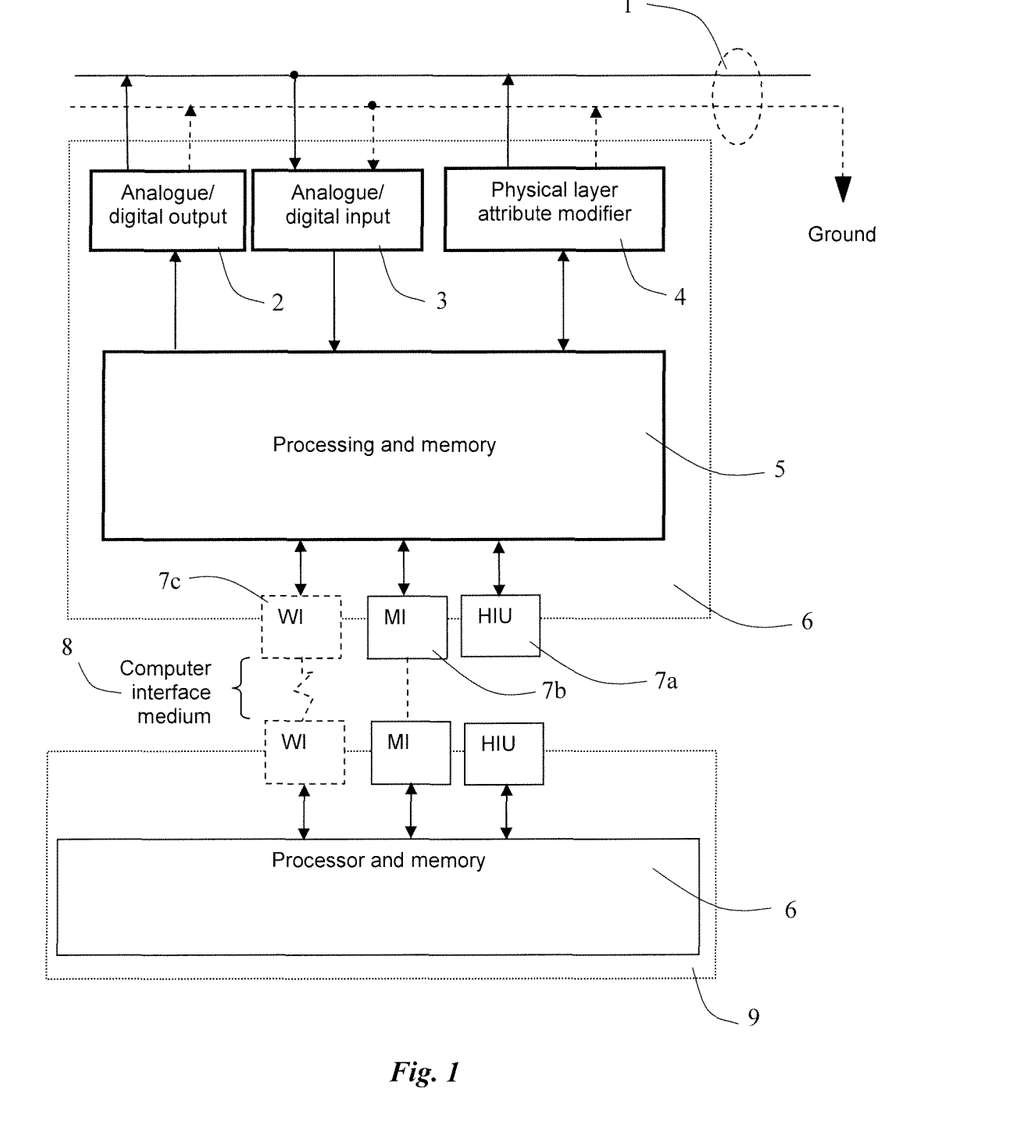
FIG. 1 is a diagrammatic view of apparatus for testing data communications on two wire combined power and data network systems for automation according to the invention.

Therefore, as shown in FIG. 1 apparatus for testing data communications on two wire combined power and data network systems for automation, in the form of portable workstation 6, comprises a control means, in the form of processing and memory 5, and connection means adapted to connect said apparatus to a subject network segment 1, which are illustrated as arrows between analogue/digital output 2 and physical layer attribute modifier 4 and the segment 1, which in this example is a Fieldbus segment. As explained further below, the control means (5) comprises data signal output means adapted to impart a test data signal to said subject segment 1 via said connection means, and a data signal disruption means adapted to vary one or more physical layer attributes of said test data signal which affect its functional quality and/or to vary one or more physical layer attributes of said subject segment 1 which are capable of affecting the functional quality of data signals carried thereon.

In the embodiment described herein the subject segment is an IEC61158-2 Fieldbus segment, and the various components and their functions referred to all operate in accordance with that protocol. The workstation 6 in this example is a portable device which can be connected to any Fieldbus segment to be tested, at any suitable location. The connection to the Fieldbus segment 1 can be to the active conductors, or alternatively to the shield or ground. In addition to the analogue/digital output 2, the workstation 6 also comprises an analogue/digital input 3, which allows for the signalling on the subject segment 1 to be received, either in order to distort it, or to measure the effect of a distortion applied to it. (The connections to the Fieldbus segment 1 are shown as being made separately for illustrative purposes. They could be physically manifested in this way, but it will be appreciated that they could also be made with one cable connection.) The analogue/digital output 2, analogue/digital input 3 and the physical layer attribute modifier 4 are connected to the processing and memory 5, which is a programmable and data storage capable ICB of the known kind which the skilled person would be able to implement with their existing skills.

Connected to the processing and memory 5 is a human interface 7a, which in this case is a visual display and keyboard of the known kind. This allows a user to operate the workstation 6 directly. Also connected to the processing and memory 5 is a machine interface 7b, which is a socket for a wired connection of the known kind. This allows for a higher level computer or controller, such as the illustrated computer 9, to be directly connected to the workstation 6, in order to control its functions. The processor and memory of the computer 9 can have complimentary or more advanced processing power than the workstation 6, for example it may comprise the main operating computer for the Fieldbus segment 1, comprising the diagnostics system and the main database, and it may be used for high level processing such as FFT calculation, control algorithms, sample recording trending, oscilloscopes and so on. The workstation 6 also optionally has a wireless link 7c to the computer 9.

The workstation 6 has an internal battery (not shown) to provide power, but it also has a power input (not shown) by which it can receive power from an external power supply, or from the subject Fieldbus segment 1 itself. The workstation 6 has an outer cover (not shown) which comprises an environmental protection seal which renders the workstation 6 resistant to the ingress of water, dust and other contaminants. As such, the workstation 6 can safely be used outdoors. In addition, the workstation 6 is an Intrinsically Safe device suitable for use in a hazardous environment. It comprises Intrinsic Safety protection components (not shown) which render it compliant with the relevant standards.

Figure 2:
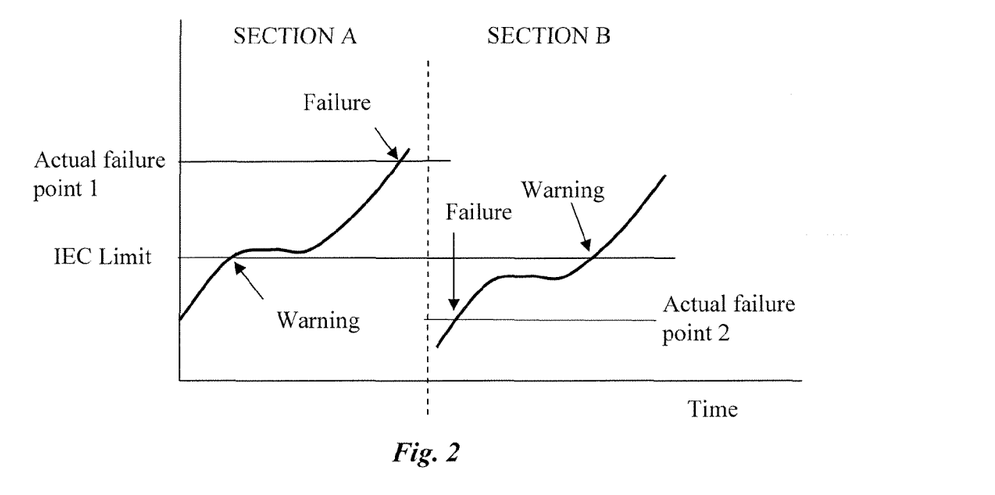
FIG. 2 is a graph illustrating failure points of a subject Fieldbus segment.

FIGS. 2 to 6 illustrate the issues which the workstation 6 is designed to solve. In particular, FIG. 2 shows two graphs which refer to a physical layer attribute over time. In section A the physical layer attribute increases from a start point up to the level of the set IEC61158-2 limit, at which point in a traditional arrangement a warning would be issued, and remedial action taken. However the physical layer attribute continues to increase without an actual failure until it reaches actual failure point 1 illustrated. This increase in the physical layer attribute will have a negative effect on the functional quality of the data signals, but they continue to have a level of functional quality sufficient to prevent an actual failure, until the physical layer attribute reaches the actual failure point 1, at which point the data signals no longer function. This actual failure point 1 is not known if existing diagnostic test equipment is used. Instead, such equipment simply determines if the physical layer attribute is above or below the illustrated IEC limit. In section B the physical layer attribute increases from a start point up to an actual failure point 2, which is lower than the IEC limit. This can happen in practice for various reasons, for example a combination or faults, unusually high sensitivity, or if components are at the limits of the recommendations set out in the standards. However, once again existing diagnostic test equipment cannot determine actual failure point 2, merely that the physical layer attribute has not breached the IEC limit.

Figure 3:
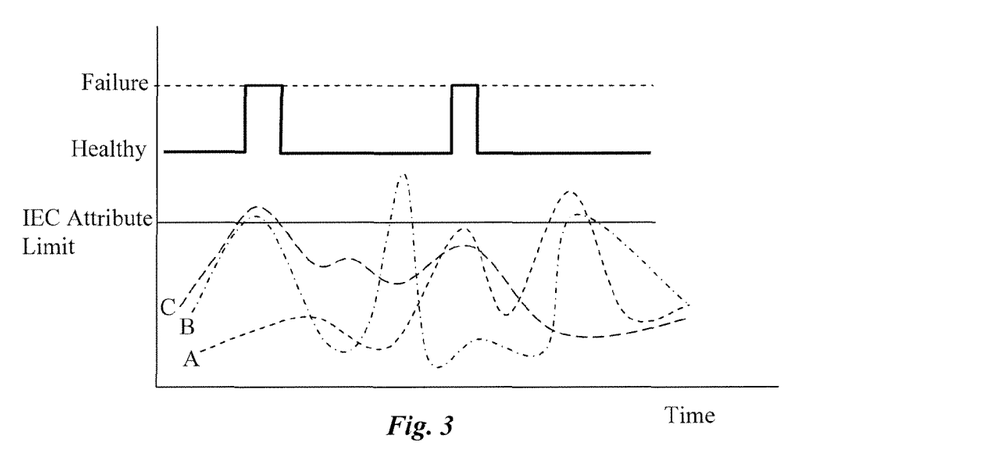
FIG. 3 is a graph illustrating failure points of a subject Fieldbus segment.

FIG. 3 shows a number of graphs which refer to three different physical layer attributes A, B and C over time, and illustrates the nature of combinational faults. In particular, the levels of physical layer attributes A, B and C increase from start points until attributes B and C both breach the IEC attribute limit. In this example this actually causes a fault, as prescribed by the limit, and a failure is recorded, as illustrated by the binary failure signal shown above. From there the physical layer attributes A, B and C fluctuate until physical layer attribute B breaches the IEC attribute limit, but does not cause an actual failure. In this case the same has occurred as is illustrated in section A of FIG. 2 prior to the actual failure point 1. In FIG. 3 the physical layer attribute B decreases before any actual fault occurs.

Next, and most importantly, physical layer attributes A and C both increase to levels close to the IEC attribute limit, but in neither case do they breach this limit. However, the combination of these two levels causes an actual failure in practice, as indicated by the failure signal shown above. This is an example of a failure which would not be detected using existing diagnostic and testing arrangements.

Finally, physical layer attributes A and B both increase to levels at which they breach the IEC attribute limit, but neither separately or in combination does this cause an actual failure in use.

The manner in which physical layer attributes can combine to cause failures or not can be complex, and depends on the physical layer attributes in question. For instance, noise added to a cable unbalance could cause a failure, such as when physical layer attributes A and C combine in FIG. 3, whereas noise or unbalance alone will not, such as when physical layer attribute B breaches the IEC attribute limit in FIG. 3.

Therefore, in use, the workstation 6 varies physical layer attributes individually and in combination with one another to ascertain the actual points of failure of a subject Fieldbus segment. In effect it varies physical layer attributes in the manners illustrated in FIGS. 2 and 3 in order to achieve actual failures, and then records when these failures occurred. Of course, in practice the physical layer attributes are carefully controlled and do not simply fluctuate as illustrated in FIG. 3.

The user connects the workstation 6 to the subject Fieldbus segment 1 at a suitable test location, for example at the power supply end, the field device end, or at a chosen location between data repeaters. They then operate the workstation 6 either directly via the human interface 7a or via a connected computer 9, and input commands to carry out particular test procedures. These can all be programmed into the processing and memory 5 in any of the known ways. For example, in one procedure a test data signal is imparted to the segment 1 via the analogue/digital input 2, which is intended to operate a field device, or to provide a data package back to the PLC at the home end. A data signal disruption sub-program of the processing and memory 5 then ramps up or down the amplitude of the test data signal until the field device or the PLC can no longer decipher it, and stops functioning. When this occurs a record is made, and an actual point of failure identified and stored. This will in most cases diverge upwards or downwards from the IEC61158-2 threshold. Similar procedures can be conducted for other physical layer attributes. For example, the zero crossing accuracy of the test data signal is distorted by the data signal disruption sub-program until a failure occurs. In both of these examples an adjustment of a physical layer attribute is being made.

The test data signal imparted to the subject Fieldbus segment 1 can be an original signal generated by the processing and memory 5, or it can be a repeated signal which was originally generated by a field device or the host. In the second instance the workstation 6 intercepts the signal via the analogue/digital input 3, and then imparts an adjusted replacement test data signal back onto the segment 1 via the analogue/digital output 2. It will be appreciated that this arrangement allows for a signal to be repeated, in other words received and then replaced with a new signal, or for a signal to simply be varied in real time by adding adjustments to it. The manner in which the test data signal is generated or adjusted will be within the expertise of the skilled person.

Figure 4:
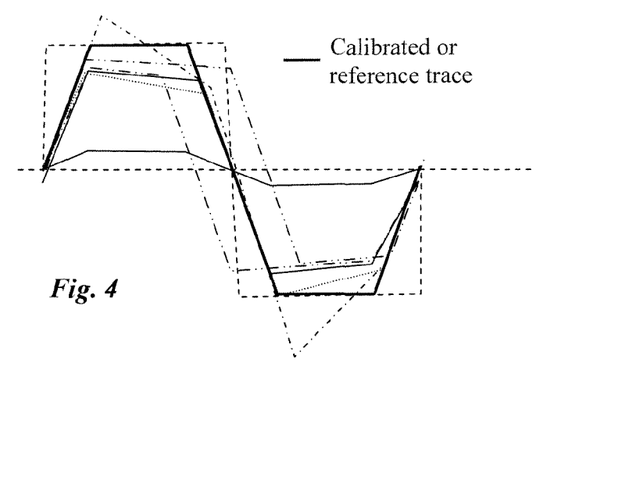
FIG. 4 is a diagrammatic illustration of the shape of differently adjusted Fieldbus data signals.

FIG. 4 illustrates examples of how the signal clarity can be adjusted by the data signal disruption sub-program in order to search for actual fault points. The solid black line in FIG. 4 represents an ideal signal with a zero crossing point in the correct place. The various dotted and hashed lines in FIG. 4 represent distortions made to the physical layer attributes of the signal, and in particular to the zero crossing point (the pair of dot dot dash lines showing advanced or retarded zero crossing points), as well as droop, amplitude, over shoot, undershoot and rise/fall times. Any of these distortions will lead to a communications failure at a particular level of distortion.

In addition to the above, by using the physical layer attribute modifier 4, physical layer attributes can be altered by way of the injection of a property. For example, in another procedure the data signal disruption sub program injects noise onto the subject Fieldbus segment 1 during signalling between components, and steadily increases that noise until the intended recipient of the signalling fails due to a communication breakdown. Once again, when this occurs a record is made, and an actual point of failure identified.

Due to the separation of the analogue/digital output 2 and the physical layer attribute modifier 4 in the given example, it can be seen how the workstation 6 can also carry out a programmed procedure where both the amplitude or the zero crossing accuracy of the test data signal can be varied at the same time as various levels of noise are injected onto the subject Fieldbus segment 1. These variances can be correlated in order to reach combinational points of failure, which can be plotted in a sequence and recorded. For example, a first physical layer attribute can be cycled through a repeated sequence of saw-toothed increases from a normal operating level up to a known discrete failure point, while a second physical layer attribute can be increased in a stepped manner one increment at a time at a frequency which matches that of the increase cycles of the first physical layer attribute. This way a sequence of correlated failure points will be plotted.

The manner in which the processing and memory 5 can be programmed to perform any of the testing procedures described above will be well known to a skilled software engineer and will not be further described here. There are obviously many other ways one or two physical layer attributes can be varied in order to discern failure points, and any are included within the scope of claim 1.

There are different ways that the actual failure point can be detected, and in particular the failure criterion can be assessed against a critical attribute or a measured attribute. In other words, the actual failure point can be determined by stressing an actual installed Fieldbus segment until it fails, or by stressing the segment until an emulated failure is detected. For example, in the case of zero crossing accuracy, a test data signal can be distorted until the actual installed Fieldbus host reports an error, which could be the onset of retries, token pass timeouts and so on. This is the most effective method because the gathered data will be empirical, and will relate to the actual host, which is fixed and tuned to the segment in question. However, in the alternative the host can be emulated by the workstation 6, or by the higher computer 9. This might be appropriate if the actual host is not available at the time. With this option, the analogue/digital input 3 measures and analyses the effects of the physical layer adjustments made, and for example determines if a distorted signal is still decipherable. With this arrangement the failure is measured rather than actually caused. Referring to a host as the reference point for failure is the best approach, because this is where a failure is most likely to occur.

Figure 5:
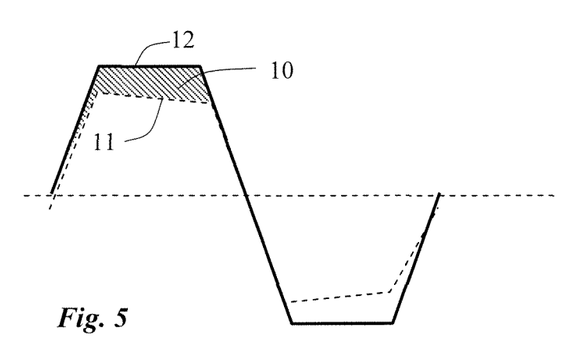
FIG. 5 is a diagrammatic illustration of the shape of differently adjusted Fieldbus data signals.

FIG. 5 illustrates another function of the workstation 9 which can be achieved by using the analogue/digital output 2 and analogue/digital input 3 together. In particular, a test data signal 12 can be imparted by the analogue/digital output 2 (in this case with no distortion), and can then be compared with a measured signal 11 seen on the segment by the analogue/digital input 3. The difference 10 represents the effect imposed by the segment or network at that point. This function obviously requires the point of signal injection to be different to the point of signal detection. Alternatively, the test data signal 12 can be a reference stored in the processing and memory 5, which is calibrated to what the signal on the segment 1 should be, and against which the measured signal 11 is compared. The measured difference 10 can be further analysed, and direct or inferred conclusions drawn, for example in relation to fast Fourier transforms, integration, frequency spectrum analysis and so on. As explained above, all of these diagnostics can also be performed in combination with the adjustment of other physical layer attributes.

Figure 6:
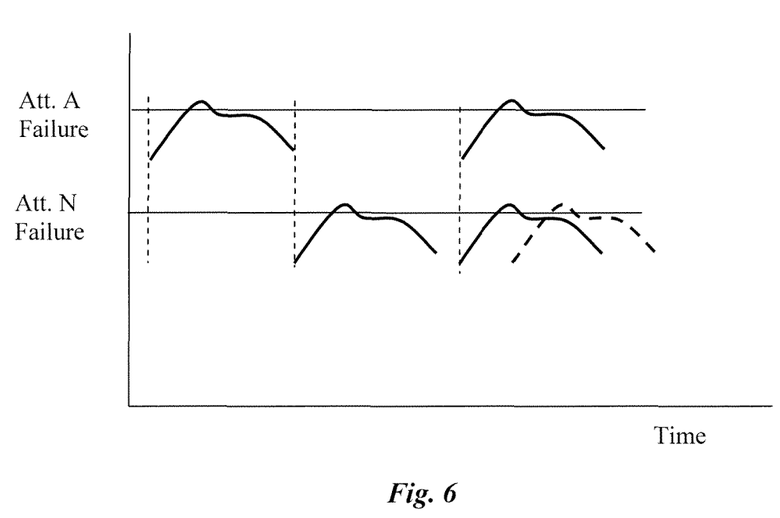
FIG. 6 is a graph illustrating failure points of a subject Fieldbus segment.

FIG. 6 shows how physical layer attribute A can be measured separately to physical layer attribute N, but then they can be measured at the same time while one is adjusted, in this case physical layer attribute N.

Figure 7:
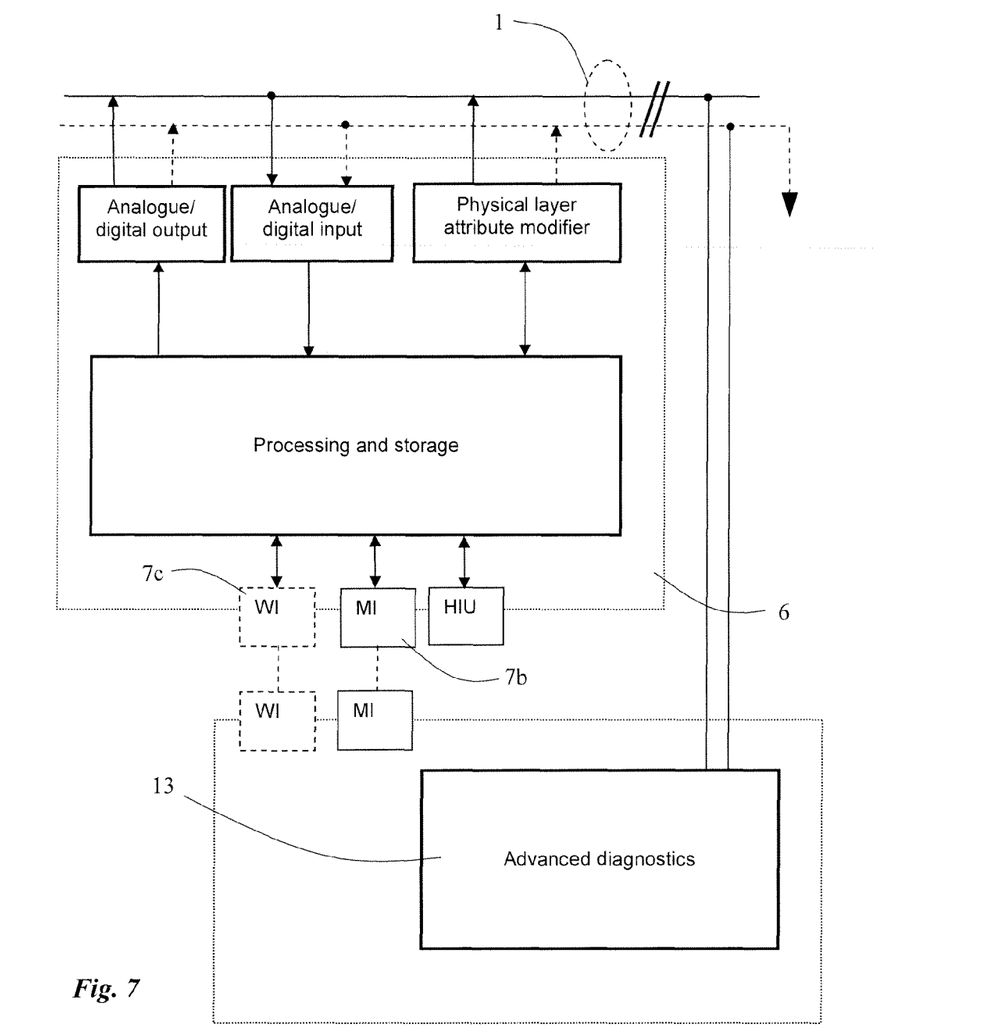
FIG. 7 is a diagrammatic view of the apparatus shown in FIG. 1 in a second configuration.

If the subject Fieldbus segment 1 comprises its own higher level diagnostic system, for example an advanced physical layer diagnostic module, either at the power supply end or the device coupler end, then correlation between the workstation 6 and such a system is advantageous. This would of course require a degree of calibration (similarity in circuit performance) between the two, but this is easily achieved. Therefore, as shown in FIG. 7, the workstation 6 is connected to a system diagnostics module 13 via either the machine interface 7*b*, or the wireless link 7*c*. This pairing of systems allows for data to be communicated between them, and for either system to be calibrated for use. In particular, the actual failure points detected through use of the workstation 6 can be established within the diagnostics module 13 for reference once the workstation 6 is removed.

The embodiment described above can be altered without departing from the scope of claim 1. For example, while the physical layer attributes it is preferred that the apparatus of the invention be able to vary are the amplitude of the test data signal, its zero crossing accuracy, and the noise on the segment, it will be appreciated that any physical layer attribute could be varied by apparatus according to the invention. Therefore, in further embodiments of the invention (not shown) apparatus is adapted to vary other combinations of physical layer attributes. The following table provides the portfolio of physical layer attributes which are varied in these other embodiments. The common mode effect is common to both or all data/power lines with reference to ground, and the differential mode effect is the difference across the data/power lines.

|  | Differential mode | Common mode |
| --- | --- | --- |
| Output | 1. Transmitting Reference Probe node telegram emulation with PL parameter adjustability (Arbitrary). 2. Normalised or reference transmitting Probe node telegram device or host (with optional LAS). 3. Adjustable single frequency, white noise/pink noise. 4. Pulse. 5. Mimic. | 1. Transmitting Probe node telegram emulation or device for cross talk sensitivity or signal rejection. 2. Adjustable single frequency, white noise/pink noise. 3. Pulse. |
| Physical layer adjustment | 1. Impedance/load (reactive resistive, including terminator emulation) adjustment. 2. Variable Constant current sink/source. 3. Timed digital interruption (brown out simulation). 4. Series impedance interruption (cable impedance adjustment and series unbalance). | 1. Unbalance reactance and/or resistance. |
| Input/ Measurement | 1. Receive Probe node telegram as a device and/or host and/or as a measurement system (with optional LAS): 2. Analogue input. 3. Digital input. 4. Sampler. | 1. Analogue input. 2. Digital input. |

In addition, in other embodiments of the invention (not show), workstations like workstation 6 are provided, but they also comprise other known functions which it is useful and practical to incorporate into a multi-function workstation or portable device. In particular, different examples comprises the ability to communicate with and adjust field devices, and to process variable data. Others comprises a device emulator and manual override, so that control valves can be 'stroked' or control loops can be simulated. Others have a visual indication of the system, for example an oscilloscope, spectrum graphs and so on. In some examples these features are added to the workstation head, but in others they are sited in an associated PC or similar system which has more processing power capability, which prevents a hand held head becoming too large. In another example the interface head is actually incorporated within a PC, in the form of a PC slot card.

Figure 8:
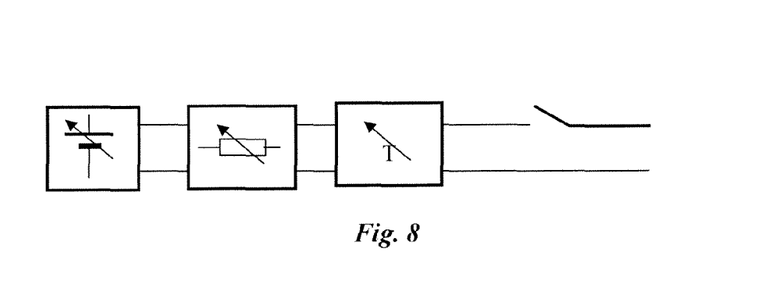
FIG. 8 is a diagrammatic view of a power supply for the apparatus as shown in FIG. 1.

In another embodiment of the invention there is included a dedicated network power supply, as illustrated in FIG. 8. This can be switched into the system, or it may have dedicated output terminals. The power supply may have adjustable voltage output and/or impedance adjustment and/or terminator adjustment (as per the physical layer modifier). This power supply may be suitable for one device or many devices.

In another embodiment of the invention (not shown) the higher computer 9, as illustrated in FIG. 1, is used to correlate the detected actual fault points against the original software design of the segment. The design drawings and the calculation database, which are produced by one of the known segment designing tools, is loaded into the higher computer, and the actual segment performance is checked against it. This allows for a further element of analysis to be performed, and for a dossier or test report print out to be produced.

Lastly, in other alternative embodiments of the invention (not shown), apparatus like any of those described above is provided, but instead of operating according to the IEC61158-2 Fieldbus protocol, the apparatus operates according to other known protocols, or according to the protocols which will replace them. In all these instances the encoding is, or will be, very similar to that described above, and the physical layer attributes which can be varied will also be very similar. As such, these alternative embodiments will all function in basically the same ways as the apparatus described above.

Therefore, the present invention provides apparatus which can accurately determine actual failure points in the communications on two wire combined power and data network systems for automation, by generating simulated errors or problems, and increasing their intensity until an actual, or simulated, fault occurs. More importantly the present invention provides for two or more of these simulated errors to be generated simultaneously to determine fault points caused by combinational problems. Once these fault points have been determined the gathered data can be put to good use in preventing singular or combinational faults which would occur before a protocol threshold were breached, by for example issuing earlier warnings. In addition, the gathered data can provide for the segment to be allowed to continue operating once a protocol threshold had been breached but no actual fault point reached, thereby preventing the need for an unnecessary shut down or unscheduled maintenance.

The invention claimed is:

1. An apparatus for testing data communications on two wire combined power and data network systems for automation, comprising a control device and a connector adapted to connect said apparatus to a subject network segment, in which said control device comprises data signal output adapted to impart a test data signal to said subject segment via said connector, and a data signal disrupter adapted to vary one or more physical layer attributes of said test data signal which affect its functional quality and/or to vary one or more physical layer attributes of said subject segment which are capable of affecting the functional quality of data signals carried thereon, and in which said apparatus is for testing data communications on a subject network segment operating under a two wire combined power and data network fieldbus-type protocol, in which said connector is adapted to connect said apparatus to said subject segment operating under the two wire combined power and data network fieldbus-type protocol, and in which said data signal output is adapted to impart a test data signal to said subject segment via said connector which test data signal is in accordance with the two wire combined power and data network fieldbus-type protocol.

2. The apparatus for testing data communications on two wire combined power and data network systems for automation as claimed in claim 1, in which said data signal disrupter is adapted to vary two or more of said physical layer attributes of said test data signal which affect its functional quality or said physical layer attributes of said subject segment which are capable of affecting the functional quality of data signals carried thereon.

3. The apparatus for testing data communications on two wire combined power and data network systems for automation as claimed in claim 1, in which said data signal disrupter is adapted to vary one or more physical layer attributes of said test data signal which affect its functional quality and/or one or more physical layer attributes of said subject segment which are capable of affecting the functional quality of data signals carried thereon in a common mode manner and/or a differential mode manner.

4. The apparatus for testing data communications on two wire combined power and data network systems for automation as claimed in claim 1, in which said data signal disrupter is adapted to adjust the amplitude of said test data signal and/or the zero crossing accuracy of said test data signal and/or to inject noise to said subject segment.

5. The apparatus for testing data communications on two wire combined power and data network systems for automation as claimed in claim 1, in which said apparatus further comprises a monitor adapted to detect faults on said subject segment caused by a failure of said test data signal.

6. The apparatus for testing data communications on two wire combined power and data network systems for automation as claimed in claim 1, in which said apparatus comprises a portable device, and in which said connector comprises an analog/digital output for imparting said test data signal to said subject segment, and a physical layer attribute modifier for varying one or more physical layer attributes of said subject segment.

7. The apparatus for testing data communications on two wire combined power and data network systems for automation as claimed in claim 6, in which said apparatus further comprises a higher controller, a data storage device associated with said higher controller, and a wired or wireless link between said portable device and said higher controller.

8. The apparatus for testing data communications on two wire combined power and data network systems for automation as claimed in claim 6, in which said portable device is powered by an internal battery and/or an external power supply and/or by a power supply of the subject segment.

9. The apparatus for testing data communications on two wire combined power and data network systems for automation as claimed in claim 6, in which said apparatus comprises environmental protection components which render the portable device resistant to the ingress of water.

10. The apparatus for testing data communications on two wire combined power and data network systems for automation as claimed in claim 1, in which said apparatus comprises Intrinsic Safety protection components which renders the apparatus safe for use in Intrinsically Safe hazardous areas.

11. An apparatus for testing data communications on two wire combined power and data network systems for automation, comprising a control means and connection means adapted to connect said apparatus to a subject network segment, in which said control means comprises data signal output means adapted to impart a test data signal to said subject segment via said connection means, and a data signal disruption means adapted to vary one or more physical layer attributes of said test data signal which affect its functional quality and/or to vary one or more physical layer attributes of said subject segment which are capable of affecting the functional quality of data signals carried thereon; and wherein said apparatus is for testing data communications on IEC61158-2 Fieldbus segments, in which said connection means is adapted to connect said apparatus to a subject IEC61158-2 Fieldbus segment, and in which said data signal output means is adapted to impart a test IEC61158-2 Fieldbus data signal to said subject segment via said connection means.

12. An apparatus for testing data communications on two wire combined power and data network systems for automation, comprising a control means and connection means adapted to connect said apparatus to a subject network segment, in which said control means comprises data signal output means adapted to impart a test data signal to said subject segment via said connection means, and a data signal disruption means adapted to vary one or more physical layer attributes of said test data signal which affect its functional quality and/or to vary one or more physical layer attributes of said subject segment which are capable of affecting the functional quality of data signals carried thereon; and wherein said apparatus is for testing data communications on a subject network segment operating under a combined power and data network fieldbus-type protocol, in which said connection means is adapted to connect said apparatus to said subject segment operating under a combined power and data network fieldbus-type protocol, and in which said data signal output is adapted to impart a test data signal to said subject segment via said connection means which test data signal is in accordance with the combined power and data network fieldbus-type protocol.

* * * * *